(12) United States Patent
Grier

(10) Patent No.: US 9,535,994 B1
(45) Date of Patent: Jan. 3, 2017

(54) METHOD AND SYSTEM FOR FORENSIC INVESTIGATION OF DATA ACCESS

(76) Inventor: Jonathan Grier, Lakewood, NJ (US)

( * ) Notice: Subject to any disclaimer, the term of this patent is extended or adjusted under 35 U.S.C. 154(b) by 422 days.

(21) Appl. No.: 13/073,978

(22) Filed: Mar. 28, 2011

Related U.S. Application Data

(60) Provisional application No. 61/318,071, filed on Mar. 26, 2010.

(51) Int. Cl.
*G06F 7/00* (2006.01)
*G06F 17/00* (2006.01)
*G06F 17/30* (2006.01)

(52) U.S. Cl.
CPC ............................... *G06F 17/30864* (2013.01)

(58) Field of Classification Search
CPC .............. G06F 17/3089; G06F 17/3071; G06F 17/30864; G06F 17/30867; G06F 17/30289; G06F 17/30873
USPC ............ 707/706, 1, 202; 709/217, 204, 219; 717/124; 726/26, 23; 340/441; 370/235; 725/19; 379/265.09
See application file for complete search history.

(56) References Cited

U.S. PATENT DOCUMENTS

| | | | |
|---|---|---|---|
| 5,761,302 A | 6/1998 | Park | |
| 6,460,036 B1 * | 10/2002 | Herz | G06F 17/30867 348/E7.056 |
| 6,473,560 B1 | 10/2002 | Linnartz et al. | |
| 6,549,638 B2 | 4/2003 | Davis et al. | |
| 7,062,784 B2 | 6/2006 | Sinquin et al. | |
| 7,171,693 B2 * | 1/2007 | Tucker et al. | 726/26 |
| 7,203,962 B1 * | 4/2007 | Moran | 726/23 |
| 7,340,778 B2 | 3/2008 | Brown | |
| 7,444,622 B2 * | 10/2008 | Grieskamp et al. | 717/124 |
| 7,458,100 B2 | 11/2008 | Jascau et al. | |
| 7,587,601 B2 | 9/2009 | Levy et al. | |
| 7,698,327 B2 * | 4/2010 | Kapur | 707/706 |
| 7,859,392 B2 * | 12/2010 | McClellan et al. | 340/441 |
| 8,200,527 B1 * | 6/2012 | Thompson | G06Q 10/0639 705/7.38 |
| 2005/0033777 A1 * | 2/2005 | Moraes et al. | 707/202 |
| 2006/0129522 A1 * | 6/2006 | Itterbeck et al. | 707/1 |
| 2008/0086473 A1 * | 4/2008 | Searl et al. | 707/9 |
| 2008/0281915 A1 * | 11/2008 | Elad et al. | 709/204 |
| 2009/0083184 A1 * | 3/2009 | Eisen | 705/50 |
| 2010/0174813 A1 * | 7/2010 | Hildreth | G06F 17/30943 709/224 |
| 2010/0274573 A1 * | 10/2010 | Feied | G06Q 50/22 705/2 |
| 2011/0106910 A1 * | 5/2011 | Grasset | 709/217 |
| 2011/0167342 A1 * | 7/2011 | de la Pena | G06F 3/0488 715/702 |
| 2011/0242979 A1 * | 10/2011 | Feroz et al. | 370/235 |
| 2012/0203846 A1 * | 8/2012 | Hull et al. | 709/206 |
| 2013/0136253 A1 * | 5/2013 | Liberman Ben-Ami et al. | 379/265.09 |
| 2013/0227604 A1 * | 8/2013 | Shields et al. | 725/19 |

OTHER PUBLICATIONS

Liu, "SIDD: A framework for detecting sensitive data exfiltration by an insider attack", Hawaii International Conference on System Sciences, 2009.
Farmer and Venema, "Forensic Discovery", Pearson, 2005.
Carvey, Windows Forensic Analysis DVD Toolkit, Second Edition, Syngress, 2009.
Grier, Detecting Data Theft With Stochastic Forensics, to be published in the Journal of Digital Investigation, 2011, Proc. 2011 Digital Forensics Research Conf., Elsevier.

\* cited by examiner

*Primary Examiner* — Susan Chen
(74) *Attorney, Agent, or Firm* — FisherBroyles LLP; Richard M. Lehrer

(57) ABSTRACT

The present invention is directed to a method for forensic examination of data access of an information system. The invention allows a user to determine the occurrence and nature of data access. In particular, it allows the user to determine if data were copied. The invention does not require modification of the information system or data beforehand, and requires access to no artifact or evidence other than information system itself.

37 Claims, No Drawings

METHOD AND SYSTEM FOR FORENSIC INVESTIGATION OF DATA ACCESS

CROSS-REFERENCE TO RELATED APPLICATIONS

This patent application claims the benefit of provisional patent application 61/318,071, filed Mar. 26, 2010.

BACKGROUND OF THE INVENTION

Field of the Invention

The invention relates to methods for examining an information system to ascertain the occurrence or nature of the access performed.

Description of the Related Art

Theft of corporate proprietary information, according to the FBI and CSI, has repeatedly been the most financially harmful category of computer crime ("CSI/FBI 2003 Computer Crime and Security Survey"). Insider data theft is especially threatening and difficult to detect, since the thief often has the technical authority to access the information (Hillstrom and Hillstrom, "Gale Encyclopedia of Small Business", Gale Group/Thomson, 2002; Yu and Chiueh, Display-only file server, Proceedings of the $4^{th}$ ACM workshop on DRM, 2004). Consequently, there is a great need for methods to conduct examinations of information systems or data to be able to determine if data has been copied. More generally, there is a need for methods to conduct examinations of information systems or data to determine the existence or nature of past access.

Numerous inventions attempt to prevent copying of data or digital assets. Examples include U.S. Pat. No. 7,062,784 to Sinquin et al (2006), U.S. Pat. No. 7,340,778 to Brown (2008), U.S. Pat. No. 7,458,100 to Jascau and Lange (2008), U.S. Pat. No. 6,473,560 to Linnartz and Talstra (2002), and U.S. Pat. No. 5,761,302 to Park (1998). These inventions attempt to prevent unauthorized data copying. However, they fail to enable a post facto examiner to determine if data were copied or not.

There are many inventions which involve modifying an information system to detect subsequent copies of data. Examples include U.S. Pat. No. 6,549,638 to Davis et al (2003). Likewise, there are many inventions which involve modifying data itself to detect subsequent copies, a process generally known as watermarking. Examples include U.S. Pat. No. 7,587,601 to Levy et al (2009). These inventions only work in the case in which the required modifications were performed before the time of alleged copying under investigation. Thus, for the majority of information systems and data, which have not been specially modified to detect copying, these inventions fail to be of use.

Several methods which detect if data were copied without requiring special modifications beforehand have been invented. Liu et all present a method to do so given a network trace of the activity (in Liu et al, "SIDD: A framework for detecting sensitive data exfiltration by an insider attack", Hawaii International Conference on System Sciences, 2009). However, this method only works when network activity has been recorded and preserved, and is available to the examiner. For the majority of examinations, this is not the case. Chow K P, Law Frank Y W, Kwan Michael Y K, Lai Pierre K Y, The Rules of time on NTFS file system, Pages 71e 85 of: SADFE '07, In: Proceedings of the second international workshop on systematic approaches to digital forensic engineering, Washington, D.C., USA: IEEE Computer Society; 2007 presents a method to detect copying given the media to which the data was copied. However, this method requires the examiner to have access to the media to which the data was copied. In the majority of examinations, the examiner does not have this.

Farmer and Venema ("Forensic Discovery", Pearson, 2005) present a method to examine a filesystem and determine the quantity of file access occurring at a particular time. They make particular use of MAC timestamps, which are times of last access of each file, automatically recorded by many modern filesystems. Their invention has been widely adopted by practitioners of the art, and is a component of numerous other inventions in the art. Their invention is capable of detecting if file access occurred at a particular time. However, their invention is incapable of distinguishing copying data from other forms of reading it, and hence cannot be used to ascertain if data was copied. Furthermore, although it can determine that activity occurred on a particular date, it cannot determine the nature of that activity.

Furthermore, on certain filesystems, such as Microsoft Windows NTFS, data can be copied without being read by the user, causing it to be invisible to the method of Farmer and Venema. In short, to date, no method has been invented which, given an information system or filesystem, which has not been specially modified beforehand, can determine if data or files were copied from it, or can determine the nature of activity which may have occurred at a particular time. Forensics expert Harlan Carvey specifically notes that despite the large need for a method to detect copying of data without acquiring the media that the data was copied to, neither he nor anyone else has been able to do so. " . . . the simple fact is that at this time, there are no apparent artifacts of the process . . . Artifacts of a copy operation . . . are not recorded in the Registry, or within the file system, as far as I and others have been able to determine." (Carvey, "Windows Forensic Analysis DVD Toolkit, Second Edition, Syngress, 2009).

Thus, what is needed is a method of examining a filesystem or information system, which can determine if data was copied, or which can determine the nature of access which may have occurred, which does not require specially modifying the system or data beforehand, and does not require access to the media to which the data may have been copied to.

SUMMARY OF THE INVENTION

In various embodiments, techniques for examination of information systems to determine the occurrence or nature of past access are presented. More specifically, and in an embodiment, a method is provided to ascertain whether data were copied from a computer filesystem. This method may be used in a forensic examination. The times of access of a plurality of datums are ascertained. If data were copied, these times will have certain characteristics. If the data were not copied, the times will have other characteristics. By examining these characteristics, it is determined if the data were copied. More generally, by examining these characteristics, the occurrence or nature of access of the data is ascertained.

BRIEF DESCRIPTION OF THE DRAWINGS

None.

DETAILED DESCRIPTION OF THE INVENTION

Concepts

Certain concepts which aid in understanding the invention shall be described. It should be noted that these concepts are helpful for understanding the invention, and therefore illustrate certain examples in certain contexts, but that the invention is not limited to these contexts or examples. The purpose of this section is an aid to comprehension. A subsequent section will describe embodiments of the invention.

Of course, the embodiments of the invention can be implemented in a variety of ways. Any particular example, architecture, implementation, or usage presented herein is provided for purposes of illustration and comprehension only and is not intended to limit the various aspects of the invention.

We can distinguish between the access pattern of copying and that of routine access. Routine file access is selective: individual files and folders are opened while others are ignored. It is also temporally irregular: files are accessed in response to user or system activity, followed by a lull in access until the next activity causes new file access.

Copying of folders, however, is nonselective: every file and subfolder within the folder is copied. It is furthermore temporally continuous: files are copied sequentially without pause until the entire operation is complete.

Copying folders is also recursive: copying one folder invokes the copying of all subfolders, which each invoke copying of their subfolders, and so on, while routine activity is randomly ordered.

This recursive nature of copying results in an additional trait. To copy a folder, the system must enumerate the folder's contents. Modern filesystems implement folders as special types of files called "directories"; to enumerate a folder's contents, the system accesses and reads the directory file. Thus, copying will invariably access a directory before accessing its files and subfolders. What's more, since this is a data read and not a file copy, Microsoft Windows NTFS does update the access time of the directory when its contents are enumerated or copied.

Thus, copying a folder creates distinct emergent patterns, which can be recognized subsequently. In particular, a filesystem examined after copying occurs will show these six characteristics: Access is Nonselective (all subfolders and files accessed), Access is Temporally Continuous, Access is Recursively Ordered, Directories Are Accessed Prior to Their Files, On Microsoft Windows NTFS: Directory timestamps updated, but not file. A filesystem where the activity was routine access and not copying will show these six characteristics: Access is Selective, Access is Temporally Irregular, Access is Random Ordered, Files Are Accessed Prior to Their Directories, and Both File and Directory Timestamps Updated.

Accordingly, we can identify folder copying, and distinguish it from routine activity. Besides folder copying, there are other forms of similar recursive, nonselective access, such as searching folders for particular files, scanning them for viruses, or even using the POSIX ls-lR command to generate a recursive directory listing. We can distinguish among these activities, and identify the software used for copying, by fingerprinting via these identifying characteristics:

File access. Are all, some, or none of the file access timestamps updated? Copying, depending on the system, updates either all files or only folders', whereas virus scanning may update only certain types of files (e.g. executable), and searching typically updates only a subset of files having a common subsequence in their name.

Skipped folders and files. What types of folders and files are skipped? Possibilities include ones beginning with periods, NTFS Alternate Data Streams, NTFS hidden files, NTFS system files, Microsoft Windows Thumbs.db, and OS X DS_Store.

Tree traversal method. Is the recursion performed breadth first, depth first, or in another order?

Sibling visit order. What order are siblings visited in? Filesystem order may be the most common, but alphabetical or other orders may be used as well. When a folder contains both files and subfolders, is one accessed before the other?

Rate. At what rate are folders and files accessed? Does the rate depend on the number of entries? On the size of files? It should be noted that a copy command may recursively enumerate all descendants of a subfolder before copying any of them, and so the timestamp updates may happen much faster than the actual copying.

By observing the above characteristics, we are able to determine the nature of the activity which occurred.

Furthermore, we can detect such activity even months after its occurrence, and even when the date of the alleged copying is unknown. To understand how, we can make two observations: First, while normal system activity (ignoring things like intentional tampering or resetting the system clock) can increase access timestamps to more recent times, it cannot decrease them. Thus, although access timestamps are extremely volatile (as each access overwrites the previous timestamp), they nonetheless maintain an invariant of always increasing monotonically.

Second, filesystem activity is by no means uniformly, or even normally, distributed over files. Activity more closely resembles heavy-tailed distributions, such as a Pareto distribution: a small amount of files generally account for a large portion of activity, with a significant amount of files undergoing negligible activity. Farmer and Venema report in their work "Forensic Discovery" (2005) that over periods as long as a year, the majority of files on a typical server are not accessed at all.

Consequently, if a folder was copied, we can expect to find the following, even if several weeks or months have elapsed since the time of copying:

Neither the copied folder, nor any of its subfolders, have access timestamps less than the time of copying.

A large number of these folders have access timestamps equal to the time of copying.

On Microsoft Windows NTFS, file timestamps will not resemble folders' timestamps. Specifically, many files will have access timestamps before any of the folders.

Copying thus creates an artifact which we call a "cutoff cluster": a point in time which no subfolder has an access timestamp prior to (hence a "cutoff"), and which a disproportionate number of subfolders have access timestamps equal to (hence a "cluster"). We generally expect a folder to have a number of rarely accessed subfolders, which cause the cutoff cluster to remain detectable for several weeks or months (or until the next act of copying). Conversely, in the absence of copying (or other nonselective, recursive access), we expect to find some folders with access timestamps extending far back in time, consistent with a heavytailed distribution.

Consequently, by measuring the size and time of a cutoff cluster pertaining to a folder, we can determine the likelihood that the folder was copied at a particular time.

Embodiments of the Invention

As used herein, "datum" means a unit of information stored in an information system. "Data" means a plurality of datum.

In one embodiment, the method is implemented as instructions in a machine-accessible and computer-readable storage medium. The instructions are executed by a machine (processing device, processor, computer, etc.). The machine is provided with an information system to be examined, or a copy, duplicate, or image of one. The inventor presently contemplates examining a hierarchical filesystem, such as Microsoft Windows NTFS or Linux ext3; however other types of filesystems or information systems may be examined as well. The machine provides an interface for the user to select a subset of data, such as a particular folder within the filesystem image, which is to be examined. The user selects such a subset, henceforth known as the "designated subset". The machine provides an interface for the user to select a particular period of time which is to be investigated. The user selects such a period of time, henceforth known as the "investigation window".

The machine has a random access memory (RAM), and loads the time of access of each datum within the designated subset into an array stored in the RAM. This array is henceforth known as the "access time array". The machine may also load into the array other relevant information or meta-information, such as the name of the datum, the type of the datum, or the creation date of the datum. I presently contemplate that the time of access is determined by examining the MAC timestamp which is stored in many filesystems; however, other means of determining time of access may be used as well.

The machine then performs one or more of the following operations:

Operation A

1. The machine may iterate through the access time array and remove the records associated with data which match a predetermined criteria. The criteria may include the type of datum, the name of the datum, the creation date of the datum, the access rights required to access the datum, or other relevant factors. In an alternative embodiment, this step is omitted.

2. The machine iterates through the array and determines the earliest time of access of any datum within the designated subset. This time is stored in the RAM in a known location. This time is henceforth known as the "earliest access time".

3. The machine compares the earliest access time with the beginning of the investigation window. If the earliest access time is before the beginning of the investigation window, the machine reports that designated subset does not appear to have been copied in its entirety during the investigation window.

4. In some embodiments, the machine may report the earliest access time, and indicate that the designated subset does not appear to have been copied in its entirety at any point subsequent to the earliest access time.

Operation B

1. The machine may iterate through the access time array and removes the records associated data which match a predetermined criteria. The criteria may include the type of datum, the name of the datum, the creation date of the datum, the access rights required to access the datum, or other relevant factors. In an alternative embodiment, this step is omitted.

2. The machine initializes a new array, henceforth known as the "yes-accessed array".

3. The machine initializes another new array, henceforth known as the "not-accessed array".

4. The machine iterates through each record of the access time array. For each record in the array, if the access time stored is within the investigation window, the record is copied into the yes-accessed array. If the access time stored is prior to the investigation window, the record is copied into the not-accessed array. If the access time stored is subsequent to the investigation window, some embodiments will skip the record and not copy it at all. Other embodiments may copy it to the not-accessed array.

Operation C

1. Operation B is performed.

2. The machine's instructions or data contain a predetermined predicate, henceforth known as the "candidate predicate". Example candidate predicates include:

2a. Is the datum a directory?
2b. Is the datum an executable file?
2c. Is the datum a predetermined type of file?
2d. Does the name of the datum match a particular regular expression?
2e. Does the name of the datum begin with a predetermined special character, such as the period character?
2f. Does a predetermined user have access rights to access the datum?

Other candidate predicates are possible as well.

3. The machine iterates through the yes-accessed array and calculates the amount of records which match the candidate predicate. This amount is henceforth known as the "yes-factor". This amount may be calculate in absolute units (that is, the number of data that match), or relative units (that is, the percentage of data that match).

4. The machine iterates through the not-accessed array and calculates the amount of records which match the candidate predicate. This amount is henceforth known as the "no-factor". This amount may be calculate in absolute units (that is, the number of data that match), or relative units (that is, the percentage of data that match).

5. A Boolean variable is initialized in the machine's RAM, henceforth known as the "test-result". If the yes-factor is sufficiently high, and the no-factor sufficiently low, the machine sets the test-result to TRUE. If the yes-factor is not sufficiently high, or the no-factor is not sufficiently low, the machine sets the test-result to FALSE.

6. The machines instructions or data include a description of the implications of each test-result. This is henceforth known as the "conclusion". Example conclusions include:

6a. When, on a Microsoft Windows NTFS system, a TRUE test-result occurs for the candidate predicate "Is the datum a directory?", the conclusion is "Designated subset appears to have been copied during investigation window." (This is because Microsoft Windows NTFS systems read only directories, and not individual files, when copying folders.)

6b. When a TRUE test-result occurs for the candidate predicate "Does the name of the datum match a particular regular expression?", the conclusion may be "Designated subset appears to have been searched during investigation window."

6c. When a TRUE test-result occurs for the candidate predicate "Is the datum an executable file?", the conclusion may be "Designated subset appears to have been virus scanned during investigation window."

Other conclusions are possible. In some embodiments, the conclusion will be immediately reported to the user. In other embodiments, the machine will, for each conclusion, store a numerical variable in RAM, henceforth known as the conclusion's "likelihood heuristic." The machine will increase the likelihood heuristic corresponding to the conclusion. After completing all operations, the machine will inform the user of the final likelihood heuristic corresponding to every conclusion.

Operation D

1. Operation B is performed.
2. The machine sorts the records of the yes-array in order of access time, from earliest access time to latest access time. This can be performed using a standard sorting algorithm, such as quicksort, or other means of sorting.

Operation E

1. Operation D is performed.
2. The machine's instructions or data contain a predetermined invariant, henceforth known as the "access invariant". Example access invariants include "Files are accessed only after their parent directory is accessed" or "Files are accessed in a temporally continuous manner, without pauses beyond a predetermined length."

Other access invariants are possible.

3. The machine iterates through the yes-accessed array and determines if the access invariant is met. This result is stored in a Boolean variable in the machine's RAM known as the test-result, similar to the test-result described above in Operation C, Step 5.
4. The machine's instructions or data contain a conclusion corresponding to each test result of each access invariant. The conclusion is reported, or the conclusion's likelihood heuristic is increased, similar to Operation C, Step 6. For example, if the access invariant "Files are accessed only after their parent directory is accessed" has test-result TRUE, the conclusion reported may be "Designated subset was copied or accessed recursively." Other conclusions are possible.

Operation F

1. Operation D is performed.
2. The machine's instructions or data contain a predetermined method of order, henceforth known as the "method of order". Example methods of order include alphabetical order, storage order, hierarchical breadth first order, and hierarchical depth first order. Other methods of order are possible.
3. The machine iterates through the yes-accessed array and determines if the order of data access is consistent with the method of order. This result is stored in a Boolean variable in the machine's RAM known as the test-result, similar to the test-result described above in Operation C, Step 5.
4. The machine's instructions or data contain a conclusion corresponding to each testresult of each method of order. The conclusion is reported, or the conclusion's likelihood heuristic is increased, similar to Operation C, Step 6.

Operation G

1. Operation D is performed.
2. The machine iterates through the yes-accessed array and subtracts the time of access of each record from the time of access of the subsequent record. Thus, the machine calculates the time lapse between record access. Using standard arithmetic routines, the machine calculates the average rate of access.
3. The machine's instructions or data contain a set of conclusions, similar to the ones described above, and rates of access associated with each conclusion. The conclusion is reported, or the conclusion's likelihood heuristic is increased, similar to Operation C, Step 6.

Operation H

1. Operation D is performed.
2. The machine iterates through the yes-accessed array and calculates its total amount of records which match the candidate predicate. This amount is henceforth known as the "yes-factor". This amount may be calculate in absolute units (that is, the number of data that match), or relative units (that is, the percentage of data that match).
3. The machine compares the yes-factor to a predetermined threshold. If the yes-factor is sufficiently large, the machine indicates that copying likely occurred.
4. In some embodiments, the machine may furthermore use a Monte Carlo simulation or a mathematical formula to calculate the probability that the yes-factor would have been observed if copying were not to have occurred. This machine reports this probability.

It is to be noted that while some embodiments may perform all of the above steps and all of the above operations, other embodiments will only perform some or one of them. Similarly, some embodiments will perform an operation multiple times, each time using different criteria.

It should be noted that some embodiments will, for reasons of speed and efficiency, perform some of the steps of the operations in different order than the example listed above, or perform some of them in parallel with each other, or perform some of them simultaneously with each other. Likewise, for reasons of speed and efficiency, some embodiments will avoid removing records from an array or copying them to another array, and instead modify the records in place in the array or use auxiliary storage in RAM.

In an alternate embodiment, the machine is not provided with an information system, but only summary information or meta-information from one. In particular, one embodiment involves providing the machine with simply a listing of data and their time of access.

In another embodiment, the user does not select a particular folder to be examined. Instead, the machine iteratively examines all folders in the filesystem, or all folders matching a predetermined criteria.

In another embodiment, the user does not select a particular period of time which is to be investigated. Instead, the machine investigates all time periods, or all time periods for which sufficient data is available, or all time periods matching a predetermined criteria.

It should be noted that the present inventor contemplates use of the invention as part of a forensic investigation to detect data copying. However, the invention can be used to determine the occurrence or nature of access forms other than copying as well, and can be used in many contexts besides forensic investigations.

Conclusions, Ramifications, and Scope

Accordingly, the reader will see that the present invention can be used to examine an information system or filesystem and determine the nature of the access performed on it. It can do so without requiring the information system to have been specially modified beforehand, and without requiring access to any evidence or artifacts other than the information system or filesystem itself. It can be used in this situation to determine if data was copied. It can be used to determine the nature of activity or access done on the data of the information system. It can be used as part of a forensic examination, or in other scenarios. Consequently, it addresses a great need which henceforth has not been met.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. 1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining this disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. An apparatus to differentiate among various forms of accessing data which is stored in an information system, said differentiation being based on a time of access for said data during a finite time period, said finite time period having a beginning time and an ending time; wherein said data includes a plurality of datum, the apparatus comprising:
   a non-transitory machine-readable medium; and
   a plurality of instructions in the machine-readable medium which, when executed by a processing machine, enable the processing machine to perform operations comprising:
      obtaining and storing in an array a time of access for at least a plurality of said datum in said data;
      iterating through said array and making at least one determination selected from the group of determinations consisting of determining an earliest of said stored times of access and determining for each of said stored times of access whether said time of access falls within said finite time period;
   when the selected determination includes determining for each of said stored times of access whether said time of access falls within said finite time period performing a comparison between said stored times of access and at least one predetermined invariant; transforming said times of access into a conclusion as to said form of access that has occurred based at least in part on a result of said comparison between said times of access and said at least one predetermined invariant; and,
   when the selected determination includes determining an earliest of said stored times of access based at least in part on said determination, transforming said times of access into a conclusion as to which of said various forms of access has occurred.

2. The apparatus according to claim 1 further comprising said processing machine further providing a user interface having features that enable selection of said data and said finite period of time.

3. The apparatus according to claim 1 wherein said determination is said determining an earliest of said stored times of access and said processing machine further performs a comparison between said earliest of said stored times of access and said beginning time;
   said comparison resulting in said earliest of said stored times of access being earlier in time than said beginning time; and,
   said conclusion as to a status of said access being that said datum associated with said plurality of said stored times of access was not copied in its entirety during said finite time period.

4. The apparatus according to claim 1 further comprising said processing machine further performing operations including comparing each of said datum associated with said plurality of said stored times of access to a set of predetermined criteria and removing all datum from said data which match at least one of said predetermined criteria.

5. The apparatus according to claim 4 wherein said set of predetermined criteria includes at least one criteria selected from the group of criteria including a type, a name, a creation date and an access right required for accessing said datum.

6. The apparatus according to claim 5 further comprising said processing machine further performing a determination of how many of said datum associated with said plurality of said stored times of access do not match said at least one predetermined predicate and storing said do not match determination as another value;
   comparing said another value to another threshold value; and;
   wherein said conclusion as to said form of access that has occurred also being based at least in part on a result of said comparison between said another value and said another threshold.

7. The apparatus according to claim 1 wherein said determination is said determining for each of said stored times of access whether said stored time of access falls within said finite period of time; wherein a plurality of said stored times of access are determined to fall within said finite period of time;
   said processing machine further performs:
      a comparison between said datum associated with said plurality of said stored times of access and at least one predetermined predicate;
      a determination of how many of said datum associated with said plurality of said stored times of access match said at least one predetermined predicate and storing said match determination as a value;
      comparing said value to a threshold value; and,
      wherein said conclusion as to said form of access that has occurred being based at least in part on a result of said comparison between said value and said threshold.

8. The apparatus according to claim 7 wherein said threshold value and said another threshold value are the same value.

9. The apparatus according to claim 7 wherein said at least one predetermined predicate includes at least one predicate from the group of predicates consisting of is the datum a directory, is the datum an executable file, is the datum a predetermined type of file, does the name of the datum match a particular regular expression, does the name of the datum begin with a predetermined special character, and does a predetermined user have access rights to access the datum.

10. The apparatus according to claim 7 further comprising said processing machine comparing said value to another threshold value; and, when said comparison results in said value being greater than said another threshold value said conclusion being that copying of said datum that match said at least one predetermined predicate likely occurred during the finite time period.

11. The apparatus according to claim 10 wherein said threshold value and another threshold value are the same threshold value.

12. The apparatus according to claim 1, wherein said processing machine further performs sorting, in order of access time, said times of access for said at least two of said plurality of said datum.

13. The apparatus according to claim 1 wherein said at least one predetermined invariant includes at least one invariant from the group of invariants consisting of files are accessed only after their parent directory is accessed and files are accessed in a temporally continuous manner, without pauses beyond a certain length.

14. The apparatus according to claim 1 wherein said processing machine further performs a comparison between said times of access of said at least two of said plurality of said datum and at least one predetermined method of order; wherein said conclusion as to said form of access that has occurred being based on a result of said comparison between said times of access of said at least two of said plurality of said datum and said at least one predetermined method of order.

15. The apparatus according to claim 14 wherein said at least one predetermined method of order includes at least one method of order from the group of methods of order consisting of alphabetical order, storage order, hierarchical breadth first order and hierarchical depth first order.

16. The apparatus according to claim 1 wherein said processing machine further performs a determination of time lapses between a plurality of consecutive stored times of access and determines an average rate of access based on said determined time lapses; wherein said conclusion as to said form of access that has occurred being based on said average rate of access.

17. The apparatus according to claim 16 wherein said plurality of consecutive times of access includes all of said consecutive times of access.

18. A method for differentiating among various forms of accessing data which is stored in an information system based on a time of access for said data during a finite time period, said finite time period having a beginning time and an ending time, wherein said data includes a plurality of datum, the method comprising:
- a processor obtaining and storing in an array a time of access for a plurality of said datum during said finite time period;
- said processor iterating through said array and making at least one determination selected from the group of determinations consisting of determining an earliest of said stored times of access and determining for each of said stored times of access whether said time of access falls within said finite time period;
- when the selected determination includes determining for each of said stored times of access whether said time of access falls within said finite time period performing a comparison between said stored times of access and at least one predetermined invariant; transforming said stored time periods into a conclusion as to said form of access that has occurred based at least in part on a result of said comparison between said times of access and said at least one predetermined invariant; and,
- when the selected determination includes determining an earliest of said stored times of access based at least in part on said determination said processor transforming said stored time periods into a conclusion as to which of said various forms of access to said data has occurred during said finite time period.

19. The method according to claim 18 wherein said determination is said determining an earliest of said stored times of access and said processor further performs a comparison between said earliest of said stored times of access and said beginning time;
- said comparison resulting in said earliest of said stored times of access being earlier in time than said beginning time; and,
- said conclusion as to said form of access to said data that has occurred being that said data was not copied in its entirety during said finite time period.

20. The method according to claim 18 further comprising said processor comparing each of said datum associated with said stored times of access to a set of predetermined criteria and removing all datum which matches at least one of said predetermined criteria.

21. The method according to claim 20 wherein said set of predetermined criteria includes at least one criteria selected from the group of criteria including a type, a name, a creation date and an access right required for accessing said datum.

22. The method according to claim 20 wherein said threshold value and said another threshold value are the same value.

23. The method according to claim 18 wherein said determination is said determining for each of said stored times of access whether said time of access falls within said finite time period; wherein a plurality of said times of access are determined to fall within said finite time period;
- said processor comparing said datum associated with said plurality of said stored times of access with at least one predetermined predicate; determining how many of said datum associated with said plurality of said stored times of access match said at least one predetermined predicate and causing said match determination to be stored as a value;
- said processor comparing said value to a threshold value; and,
- wherein said conclusion as to said form of access to said data that has occurred being based at least in part on a result of said comparison between said value and said threshold.

24. The method according to claim 23 further comprising said processor determining how many of said datum associated with said plurality of said stored times of access do not match said at least one predetermined predicate and causing said do not match determination to be stored as another value;
- said processor comparing said another value to another threshold; and,
- wherein said conclusion as to said form of access to said data that has occurred also being based at least in part on a result of said comparison between said another value and said another threshold.

25. The method according to claim 23 wherein said at least one predetermined predicate includes at least one predicate from the group of predicates consisting of is the datum a directory, is the datum an executable file, is the datum a predetermined type of file, does the name of the datum match a particular regular expression, does the name of the datum begin with a predetermined special character, and does a predetermined user have access rights to access the datum.

26. The method according to claim 23 further comprising said processor comparing said value to another threshold value; and, when said comparison results in said value being greater than said another threshold value said conclusion being that copying of said datum that match said at least one predetermined predicate likely occurred during said finite time period.

27. The method according to claim 26 wherein said threshold value and said another threshold value are the same threshold value.

28. The method according to claim 25, further comprising said processor sorting, in order of access time, said times of access for said at least two of said plurality of said datum.

29. The method according to claim 18 wherein said at least one predetermined invariant includes at least one invariant from the group of invariants consisting of files are accessed only after their parent directory is accessed and files are accessed in a temporally continuous manner, without pauses beyond a certain length.

30. The method according to claim 18 further comprising said processor comparing said times of access of said at least two of said plurality of said datum and at least one predetermined method of order; wherein said conclusion as to a form of access to said data that has occurred being based on a result of said comparison between said times of access of said at least two of said plurality of said datum and said at least one predetermined method of order.

31. The method according to claim 30 wherein said at least one predetermined method of order includes at least one method of order from the group of methods of order consisting of alphabetical order, storage order, hierarchical breadth first order and hierarchical depth first order.

32. The method according to claim 18 further comprising said processor determining time lapses between a plurality of consecutive times of access in said stored times of access and determining an average rate of access based on said determined time lapses; wherein said conclusion as to said form of access to said data that has occurred being based on said average rate of access.

33. The method according to claim 32 wherein said plurality of consecutive stored times of access includes all of said consecutive stored times of access.

34. A method for differentiating among various possible forms of accessing an electronically accessed folder, wherein said folder is stored in an information system, said folder includes at least one subfolder stored in said information system, at least one of said folder and said subfolder includes an associated file stored therein, and wherein said folder and said subfolder are each implemented as a directory file in said information system, the method comprising:
a processor reviewing a characteristic of said electronic access to said folder and determining from said review whether said access is nonselective; said processor concluding, when a result of said determination is that said electronic access to said folder is nonselective and when said access to said folder or to said subfolder does not have an access timestamp that is earlier than a time associated with a cutoff time of the nonselective access, that said form of accessing is that said folder has been copied.

35. The method according to claim 34 further comprising said processor further determining that said access is temporally continuous.

36. The method according to claim 35 further comprising said processor further determining that said access is recursively ordered and said directory files are accessed prior to their associated file.

37. The method according to claim 34 further comprising said processor concluding, when a result of said determination is that said electronic access to said folder is selective, that said form of accessing is that said folder has not been copied.

* * * * *